US012809090B2

(12) United States Patent
De Koninck et al.

(10) Patent No.: US 12,809,090 B2
(45) Date of Patent: Nov. 24, 2026

(54) HYBRID RING-INTERFEROMETER TUNING SYSTEMS FOR EFFICIENT RING-ASSISTED INTERFEROMETER CONTROL

(71) Applicant: Mellanox Technologies, Ltd., Yokneam (IL)

(72) Inventors: Yannick De Koninck, Hofstade (BE); Hao Li, Vancouver, WA (US); Jochem Verbist, Edegem (BE); Jens Kjergaard, Kastrup (DK); Meer Nazmus Sakib, San Jose, CA (US)

(73) Assignee: Mellanox Technologies, Ltd., Yokneam (IL)

( * ) Notice: Subject to any disclaimer, the term of this patent is extended or adjusted under 35 U.S.C. 154(b) by 297 days.

(21) Appl. No.: 18/628,973

(22) Filed: Apr. 8, 2024

(65) Prior Publication Data

US 2025/0314830 A1 Oct. 9, 2025

(51) Int. Cl.

| | |
|---|---|
| ***G02B 6/293*** | (2006.01) |
| ***G02B 6/12*** | (2006.01) |
| ***G02F 1/01*** | (2006.01) |
| ***G02F 1/225*** | (2006.01) |

(52) U.S. Cl.

CPC ..... *G02B 6/29341* (2013.01); *G02B 6/12004* (2013.01); *G02B 6/29338* (2013.01); *G02F 1/0147* (2013.01); *G02F 1/225* (2013.01); *G02B 6/29344* (2013.01); *G02B 6/29353* (2013.01)

(58) Field of Classification Search

CPC ........ G02B 6/12; G02B 6/12004; G02B 6/26; G02B 6/29338; G02B 6/29341; G02B 6/29353; G02F 1/225; G02F 1/2255; G02F 1/2257

See application file for complete search history.

(56) References Cited

U.S. PATENT DOCUMENTS

| | | | | | |
|---|---|---|---|---|---|
| 4,979,825 | A * | 12/1990 | Iwashita | G02F 2/00 | 356/477 |
| 2009/0169211 | A1* | 7/2009 | Chen | G02B 6/29355 | 398/79 |
| 2010/0014544 | A1* | 1/2010 | Heideman | H01S 5/065 | 372/20 |
| 2019/0013878 | A1 | 1/2019 | Paraiso | | |
| 2019/0027898 | A1* | 1/2019 | Bovington | H01S 5/021 | |
| 2020/0200975 | A1 | 6/2020 | Ma | | |
| 2020/0280173 | A1* | 9/2020 | Gao | H01S 5/02415 | |
| 2022/0019023 | A1* | 1/2022 | Ren | H04B 10/505 | |
| 2023/0113820 | A1* | 4/2023 | Canoglu | H01S 5/0612 | 356/4.01 |
| 2025/0297854 | A1* | 9/2025 | Sakib | G01B 11/272 | |

* cited by examiner

*Primary Examiner* — Michael Stahl

(74) *Attorney, Agent, or Firm* — Lowenstein Sandler LLP

(57) ABSTRACT

A system can include a ring waveguide, a ring waveguide heater operatively coupled to the ring waveguide, and an interferometer including a first arm waveguide and a second arm waveguide. The first arm waveguide is positioned to be heated by the ring waveguide heater and to not be optically coupled to the ring waveguide, and the second arm waveguide is positioned to be optically coupled to the ring waveguide.

20 Claims, 7 Drawing Sheets

300

HYBRID RING-INTERFEROMETER TUNING SYSTEMS FOR EFFICIENT RING-ASSISTED INTERFEROMETER CONTROL

TECHNICAL FIELD

At least one embodiment pertains to processing resources used to perform and facilitate high-speed communications. For example, at least one embodiment pertains to technology for implementing hybrid ring-interferometer tuning systems for efficient ring-assisted interferometer control.

BACKGROUND

Communication systems transmit signals from a transmitter to a receiver via a communication channel or medium (e.g., cables, printed circuit boards, links, wirelessly, etc.) For example, the transmitter can use serial communication to transmit serial data within a serial data stream to the receiver via a serial communication channel (e.g., data sent sequentially on a per-bit basis over a single channel). As another example, the transmitter can use parallel communication to transmit parallel data within a parallel data stream to the receiver via the communication channel (i.e., multiple bits of data sent simultaneously via respective channels). Data can be encoded within a carrier wave or signal using a modulation technique. One example of a modulation technique is frequency modulation, which encodes data within a carrier signal by varying the frequency of the carrier signal. To do so, a modulator can combine the carrier signal with a data signal (i.e., baseband signal) to generate a modulated signal.

BRIEF DESCRIPTION OF DRAWINGS

Various embodiments in accordance with the present disclosure will be described with reference to the drawings, in which.

DETAILED DESCRIPTION

Figure 1:
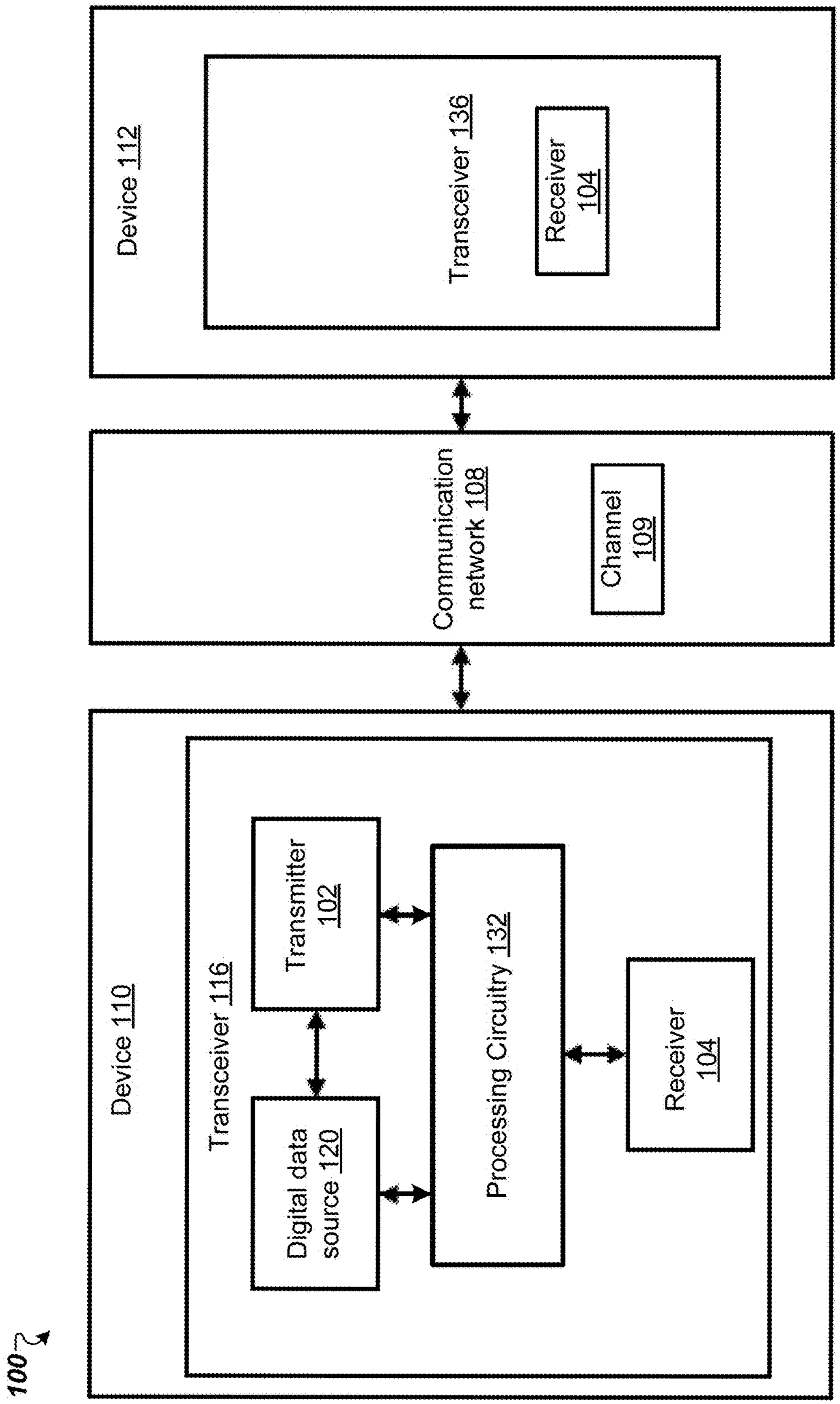
FIG. 1 is a block diagram of an example communication system, in accordance with at least some embodiments.

Embodiments described herein relate to hybrid ring-interferometer tuning systems for efficient ring-assisted interferometer control. In particular, some embodiments are directed to a system including a ring waveguide, a ring waveguide heater operatively coupled to the ring waveguide, and an interferometer including a first arm waveguide and a second arm waveguide, wherein the first arm waveguide is positioned to be heated by the ring waveguide heater and to not be optically coupled to the ring waveguide, and wherein the second arm waveguide is positioned to be optically coupled to the ring waveguide. Embodiments described herein can be used to reduce complexity and increase thermal efficiency as compared to other interferometer systems. For example, embodiments described herein can utilize a single heater to thermally tune a ring waveguide and an interferometer simultaneously (or near simultaneously) to minimize perturbation of the waveform the filter response, which can reduce control complexity and heater power usage.

Optical links are communication links that use optical fibers to transmit optical signals (e.g., data signals or data streams) between two points. For example, an optical transmitter ("transmitter") can receive optical signals generated by one or more optical signal generators, and the transmitter can transmit optical signals to an optical receiver ("receiver"). In some implementations, an optical signal generator includes a laser. A transmitter can include a modulator that can encode data onto an optical signal using modulation, and the transmitter can transmit modulated optical signals to a receiver. The receiver can include a photodetector to detect optical signals (e.g., modulated optical signals) received from the transmitter, and can convert the optical signals into electrical signals that can be processed by an electronic device. Optical links can be used to transmit large amounts of data over long distances with minimal signal loss. Optical links can be used in a variety of applications that can utilizes the transmission of optical signals, such as switches, processing units (e.g., graphics processing units (GPUs), etc.

Various optical networking technologies can be used for transmitting multiple optical signals (e.g., data signals or data streams) over a single optical fiber within an optical link with little to no optical signal interference. Such optical networking technologies can increase the amount of data that can be transmitted via a single optical fiber, which can increase bandwidth efficiency and reduce the amount of infrastructure (e.g., hardware) needed for data communication.

One type of optical networking technology is time division multiplexing (TDM). In TDM, multiple optical signals (e.g., data signals or data streams) can be transmitted over a single optical fiber by assigning each optical signal a respective time slot, and transmitting an optical signal during its respective time slot. The time slots can be allocated to optical signals in a cyclic manner, in which each optical signal transmits a small amount of data during its assigned time slot. The time slots can be very short, such as on the order of microseconds, and the cycle is repeated many times per second to allow for rapid data transfer.

Another type of optical networking technology is frequency division multiplexing (FDM). In FDM, multiple optical signals (e.g., data signals or data streams) can be transmitted over a single optical fiber by assigning each optical signal a respective frequency band. More specifically, each optical signal can be modulated onto a respective carrier frequency to generate a respective modulated signal, and the modulated signals can be combined and transmitted by a receiver over a single optical fiber. At the receiver, the modulated signals can be separated using one or more filters (e.g., band-pass filters). More specifically, the one or more filters permit optical signals to pass through that meet one or more frequency specifications set by the one or more filters, while filtering out signals that do not meet the one or more frequency specifications. Accordingly, FDM can be used by optical links to simultaneously transmit multiple channels simultaneously over the same frequency band.

Yet another type of optical networking technology is wavelength division multiplexing (WDM). In WDM, multiple optical signals (e.g., data signals or data streams) having different wavelengths can be combined into a single optical signal and transmitted over a single optical fiber (e.g., simultaneous transmission of multiple wavelengths of light). More specifically, WDM techniques can generally involve combining and separating multiple optical signals having different wavelengths onto a single optical fiber. By doing so, WDM technology can allow for more data to be transmitted over an optical fiber and/or increase the capacity of the optical fiber.

Examples of WDM technology includes coarse wavelength division multiplexing (CWDM) and dense wavelength division multiplexing (DWDM). In CWDM, multiple optical signals (e.g., data signals or data streams) at different wavelengths are combined into a single optical signal and transmitted over a single optical fiber. The names CWDM and DWDM refer to the coarseness and denseness, respectively, of wavelength separation between wavelengths. More specifically, CWDM uses a coarser or wider wavelength separation than DWDM, which uses a denser or narrower wavelength separation. For example, wavelengths for CWDM can be separated by, e.g., about 80 nanometers (nm), while wavelengths for DWDM can be separated by, e.g., about 0.8 nm. The wider wavelength separation used in CWDM means that CWDM can support fewer channels and have lower power budgets than DWDM, and so CWDM can be used for shorter distances than DWDM, such as, e.g., up to about 80 kilometers (km). At the same time, CWDM uses less complex equipment and can use lower-cost optical components as compared to DWDM, which can make it a more cost-effective solution for applications that may not require denser wavelength separation.

Some optical link systems can implement at least one interferometer (e.g., in a transmitter and/or in a receiver) that functions as a demultiplexer or a multiplexer. In some embodiments, the interferometer is a ring-assisted interferometer. In some implementations, an interferometer is a Mach-Zehnder interferometer (MZI). An MZI is an interferometer that leverages the electro-optic effect, in which a change in the refractive index of a material is induced by an applied electric field, to create an interference pattern that can be modulated to encode information onto an optical signal.

An MZI can include an input section to receive an input optical signal having at least a first wavelength and a second wavelength, and split the optical signal into a first optical signal and a second optical signal each having at least the first wavelength and the second wavelength. The input section of the MZI can be operatively coupled to at least one optical signal generator to receive the input optical signal from the at least one optical signal generator. In some implementations, an optical signal generator is a laser. In some implementations, the at least one optical signal generator can include a multi-wavelength optical signal generator that can generate multiple wavelengths of an optical signal. The input section of the MZI can include an input splitter. In some implementations, the input section of the MZI includes a 1×2 splitter.

An MZI can include a pair of arm waveguides. A first arm waveguide can receive the first optical signal from the input section and a second arm waveguide can receive the second optical signal from the input section. The first and second arm waveguides of the MZI can be formed from a material that exhibits the electro-optic effect, such as lithium niobate ($LiNbO_3$), gallium arsenide (GaAs), indium phosphide (InP), etc.

The MZI can further include an output section that generates at least one output optical signal based on the optical signals received from the first and second arm waveguides. More specifically, the output section generates at least one output optical signal as a function of the phase difference between the first optical signal received from the first arm waveguide and the second optical signal received from the second arm waveguide. In some implementations, a single output optical signal is generated and output through a single output port of the input combiner. In some implementations, two output optical signals are generated and output through two respective output ports of the input combiner (e.g., a mixture of the optical signals received from the first and second arm waveguides). In some implementations, the output section includes a 2×2 input combiner including two input ports and two output ports. In some implementations, the output section of the MZI includes a directional coupler. The output section of the MZI can be operatively coupled to photodetectors (PDs) to demodulate the optical signals output by the output section and recover the transmitted data.

In some implementations, an interferometer is an unbalanced MZI in which the first arm waveguide is a delay arm waveguide, and the second arm waveguide is a non-delay arm waveguide. The delay arm waveguide has a geometry, different from the non-delay arm waveguide, that causes a delay in the optical signal traveling through the delay arm waveguide relative to the optical signal traveling through the non-delay arm waveguide. More specifically, the delay arm waveguide can be longer than the non-delay arm waveguide. The phase of the optical signal received from the non-delay arm waveguide can be approximately constant (e.g. approximately zero phase shift as a function of wavelength), while the phase of the optical signal received from the delay arm waveguide can shift as a function of wavelength. More specifically, the phase shift can be approximately linear as a function of wavelength (e.g., sawtooth waveform). Thus, the phase difference between the optical signals received by an output section from the non-delay arm waveguide and the delay arm waveguide can approximately linearly depend as a function of wavelength (e.g., sawtooth waveform).

The output power of each optical signal output by the output section (e.g., input combiner) can be determined from the sine function of the phase difference between the optical signals. For example, if the phase shift of the optical signal received from the delay arm waveguide is $\phi_{arm1}$ and the phase shift of the optical signal received from the non-delay arm waveguide is $\phi_{arm2}$, then the output power of each optical signal can be a function of $\sin(\phi_{arm2}-\phi_{arm1})$ (e.g., extrema occur at $\phi_{arm2}-\phi_{arm1}=\pm\pi/2$). Accordingly, the close to linear phase delay observed due to the arm waveguide imbalance of an unbalanced MZI can result in a sinusoidal waveform power response (not a flat-band power response).

However, sinusoidal waveform power responses can be sensitive to process variations or drift in the wavelengths. To that end, it may be beneficial to design the interferometer to generate more flattened (e.g., rectangular) shaped waveform power responses. To achieve this, a ring waveguide can be integrated with the interferometer to form a ring-assisted interferometer (e.g., ring-assisted MZI). A ring waveguide is a waveguide in the shape of a closed loop having an associated resonant frequency. In some implementations, the ring waveguide is an all-pass ring waveguide. More specifically, the ring waveguide can be coupled to a single bus waveguide corresponding to the non-delay arm waveguide. The power coupling between the ring waveguide and the non-delay arm waveguide determines the contrast between on-resonance wavelengths and off-resonance wavelengths. The ring waveguide can be designed to introduce a phase shift in the optical signal traveling through the non-delay arm waveguide as a function of wavelength, in contrast to the approximately constant phase waveform observed without the assistance of the ring waveguide. It can be shown that the resulting power responses are more flattened (e.g., rectangular) shaped waveform power responses. In some implementations, the extra length of the delay arm waveguide relative to the non-delay arm waveguide is equal to about half of the circumference of the ring waveguide.

A ring-assisted interferometer can function properly when pass bands of the filter response are aligned to carrier wavelengths and if the filter response is such that it allows for optimum crosstalk rejection. Achieving such proper functioning can include tuning the ring waveguide and the interferometer of the ring-assisted interferometer to a particular (e.g., optimal) state. In some implementations, tuning the ring waveguide and the interferometer of the ring-assisted interferometer includes performing thermal tuning using heaters operatively coupled to respective waveguides of the ring waveguide and the interferometer. For example, a heater can include a set of heater pads connected to a wire. In some implementations, a heater is formed from tungsten (W). The heat generated by a heater operatively coupled to a waveguide can adjust the thermal properties of the waveguide material, which can alter the rate of propagation of an optical signal through the waveguide. For example, adjusting properties of the waveguides can include adjusting voltages of the heaters operatively coupled to the ring waveguide and the interferometer.

Thermal tuning of a ring-assisted interferometer can cause a shift or translation in the power waveforms (e.g., filter response) of the ring-assisted interferometer. The thermal tuning can also perturb the shape of the power waveforms, which can be undesirable. Perturbation of the shape of the power waveforms can be reduced or eliminated by simultaneously heating the ring waveguide and the interferometer, such that a ratio of a difference between a first accumulated phase shift induced in the first arm waveguide and a second accumulated phase shift induced in the second arm waveguide, to a third accumulated phase shift induced in the ring waveguide, is a predetermined fraction For example, the predetermined fraction can be about one half.

One way of achieving simultaneous temperature adjustment is by coupling a ring waveguide heater to the ring waveguide, coupling an arm waveguide heater to the first arm waveguide (e.g., delay arm waveguide), causing a first voltage to be applied to the ring waveguide heater, and causing a second voltage to be applied to the arm waveguide heater. For example, the second voltage can be about half of the first voltage. However, such simultaneous temperature adjustment can require the use of complex control hardware and/or software. Additionally, such simultaneous adjustment can cause power to be consumed by multiple heaters (e.g., at least two heaters), which can contribute to sub-optimal power consumption.

Aspects of the present disclosure can address the deficiencies above and other challenges by implementing hybrid ring-interferometer tuning systems for efficient ring-assisted interferometer control. A ring-assisted interferometer described herein can include a ring waveguide and an interferometer, and a ring waveguide heater operatively coupled to the ring waveguide. The interferometer can include a first arm waveguide and a second arm waveguide. In some embodiments, the interferometer is an MZI. For example, the first arm waveguide can be a delay arm waveguide and the second arm waveguide can be a non-delay arm waveguide. In some embodiments, a first arm heater is operatively coupled to the first arm waveguide and a second arm heater is operatively coupled to the second arm waveguide.

More specifically, the ring-assisted interferometer can be designed such that the first arm waveguide is positioned to be heated by the ring waveguide heater and to not be optically coupled to the ring waveguide. That is, the first arm waveguide (e.g., delay arm waveguide) can be brought in sufficient proximity to the ring waveguide such that it will experience a temperature change caused by the ring waveguide heater, but without optical coupling. In some embodiments, the first arm waveguide is separated from the ring waveguide by a distance that ranges from about 0.8 micrometer to about 1.2 micrometers. In some embodiments, the first arm waveguide is separated from the ring waveguide by a distance of about 1 micrometer.

The ring-assisted interferometer can be further designed such that the second arm waveguide is positioned to be optically coupled to the ring waveguide. The second arm waveguide can be optically coupled to the ring waveguide via at least one coupler. In some embodiments, the at least one coupler includes a pulley coupler. In some embodiments, the at least one coupler includes a point coupler. In some embodiments, the at least one coupler includes a multimode interferometer (MMI)-based coupler.

The design of the ring-assisted interferometer can be optimized to enable a controller, implemented by at least one processing device operatively coupled to a memory, to cause simultaneous or near-simultaneous thermal tuning of both the ring waveguide and the interferometer using the single ring waveguide heater. For example, the controller can cause a voltage to be applied to the ring waveguide heater to simultaneously adjust the temperature of the ring waveguide to the first temperature and to adjust the temperature of the first arm waveguide to the second temperature at approximately the same rate. Such simultaneous adjustment can shift the waveforms of the filter response of the ring-assisted interferometer with reduced perturbation (e.g., no perturbation). In some embodiments, the heater is configured and positioned such that a targeted ratio of a thermal energy that is applied to the ring waveguide gets applied to the first arm waveguide.

For example, when the controller actuates the ring waveguide heater, the ring waveguide heater can induce an accumulated phase shift in the ring waveguide ($\Delta\phi_{ring}$), an accumulated phase shift in the first arm waveguide (e.g., delay arm waveguide) ($\Delta\phi_{arm1}$), and an accumulated phase shift in the second arm waveguide (e.g., non-delay arm waveguide) ($\Delta\phi_{arm2}$). The geometry of the ring waveguide heater, the ring waveguide, and the arm waveguides can be designed such that $$\Delta\phi_{arm1} - \Delta\phi_{arm2} = \frac{\Delta\phi_{ring}}{K}.$$

That is, the ratio of the difference between the first accumulated phase shift induced in the first arm waveguide and a second accumulated phase shift induced in the second arm waveguide, to a third accumulated phase shift induced in the ring waveguide, is a predetermined fraction 1/K. In some embodiments, the predetermined fraction is one half (K=2).

A description of the relationship of temperature to phase shift will now be described. As an optical signal or mode at wavelength/with effective index $n_{eff}$ can propagate through an infinitesimally short piece of waveguide of length dx, the corresponding phase shift or change $d\phi$ can as described by the following equation as a function of position x in the direction parallel to waveguide propagation:

$$d\phi = \frac{2\pi}{\lambda} n_{eff}(x)dx,$$

where $n_{eff}(x)$ is the effective index at position x.

A phase shift induced in a waveguide of length L can be determined as follows:

$$\phi = \int^L d\phi = \int^L \frac{2\pi}{\lambda} n_{eff}(x)dx = \frac{2\pi}{\lambda}\int^L (n_{eff,0} + \Delta n_{eff,T}(x))dx = \phi_0 + \frac{2\pi}{\lambda}\int^L \Delta n_{eff,T}(x)dx \quad (1)$$

where $n_{eff,0}$ is a nominal index value at nominal temperature $T_0$, $\Delta n_{eff,T}(x)$ is the perturbation or change to the nominal index value due to a temperature change at position x, and $\phi_0$ is a phase shift at the nominal temperature $T_0$. The perturbation $\Delta n_{eff,T}(x)$ can be given by the following equation:

$$\Delta n_{eff,T}(x) = \frac{\Delta n_{eff}}{\Delta n_{WG}}\frac{\Delta n_{WG}}{\Delta T}\Delta T(x) \quad (2)$$

where $$\frac{\Delta n_{eff}}{\Delta n_{WG}}$$

is the change in the effective index due to a change in the index of the waveguide material (e.g., silicon (Si)), and $$\frac{\Delta n_{WG}}{\Delta T}$$

is the change in the waveguide index due to a change in temperature, and $\Delta T(x)$ is a change in temperature as a function of x. The quotient $$\frac{\Delta n_{eff}}{\Delta n_{WG}}$$

can be specific to the waveguide geometry and/or waveguide material (e.g., Si) and can be determined through simulation. The quotient $$\frac{\Delta n_{WG}}{\Delta T}$$

can correspond to a thermo-optic coefficient ($c_{TO,WG}$) for the waveguide material. For example, if the waveguide is a Si waveguide, then the thermo-optic coefficient can be about 1.94E-4 $K^{-1}$.

Disregarding $\phi_0$, using equation (2), and replacing $$\frac{\Delta n_{WG}}{\Delta T}$$

with $c_{TO,WG}$, the following equation can be used to determine an accumulated phase shift induced by the thermal tuner, $\Delta\phi_T$:

$$\Delta\phi_T = \frac{2\pi}{\lambda}\int^L \Delta n_{eff,T}(x)dx = \frac{\Delta n_{eff}}{\Delta n_{Si}} c_{TO,WG}\int^L \Delta T(x)dx \quad (3)$$

The output of a thermal simulation can be a two-dimensional (2D) temperature profile $\Delta T(x, y)$ where y is the position perpendicular to the waveguide propagation direction. The temperature profile can be averaged at each value of x to obtain $\Delta T(x)$ by averaging the 2D temperature profile $\Delta T(x, y)$ over y as follows:

$$\Delta T(x) = \frac{1}{w_{WG}}\int^{WG} \Delta T(x, y)dy \quad (4)$$

where $w_{wg}$ is the width of the waveguide WG. By combining equations (3) and (4), the accumulated phase shift $\Delta\phi_T$ can be determined based on the 2D temperature profile $\Delta T(x, y)$ as follows:

$$\Delta\phi_T = \frac{2\pi}{\lambda}\frac{\Delta n_{eff}}{\Delta n_{Si}}\frac{c_{TO,Si}}{w_{wg}}\int^L\int^{wg} \Delta T(x, y)dydx \quad (5)$$

The double integral of equation (5) is essentially an area integral of the 2D temperature profile $\Delta T(x, y)$ across the waveguide. Therefore, equation (5) can be rewritten as:

$$\Delta\phi_T = \frac{2\pi}{\lambda}\frac{\Delta n_{eff}}{\Delta n_{Si}}\frac{c_{TO,Si}}{w_{wg}}\int\int^{WG} \Delta T(x, y)dA \quad (6)$$

As described above with respect to equations (1)-(6), an accumulated phase shift induced in a waveguide corresponds to an accumulated temperature change along a length of the waveguide. For example, the first accumulated phase shift induced in the first arm waveguide (e.g., delay arm waveguide) can correspond to a first accumulated temperature change along a length of the first arm waveguide, the second accumulated phase shift induced in the second arm waveguide (e.g., non-delay arm waveguide) can correspond to a second accumulated temperature change along a length of the second arm waveguide, and the third accumulated phase shift induced in the ring waveguide can correspond to a third accumulated temperature change along a length of the ring waveguide (e.g., if the widths of the first arm waveguide, the second arm waveguide and the ring waveguide are approximately equal).

Further details regarding implementing hybrid ring-interferometer tuning systems for efficient ring-assisted interferometer control will be described in further detail below with reference to FIGS. 1-6.

Advantages of the present disclosure include, for example, reduced complexity and increased thermal efficiency as compared to traditional systems having interferometers. For example, embodiments described herein can utilize a single heater (e.g., ring waveguide heater) to thermally tune a ring waveguide and an interferometer (e.g., MZI) simultaneously (or near simultaneously) to minimize perturbation of the waveform the filter response, which can reduce control complexity and heater power usage.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. In one example, devices 110 and 112 may correspond to network devices such as switches, network adapters, or data processing units (DPUs).

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 104 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of devices 110 and 112 may include suitable hardware and/or software for receiving signals, such as data signals from the communication network 108. For example, the receiver 104 may include components for receiving optical signals.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116. In some embodiments, the processing circuitry 132 can facilitate a method to implement phase-dithering techniques for encoding auxiliary information within optical signal, as described below.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 2A:
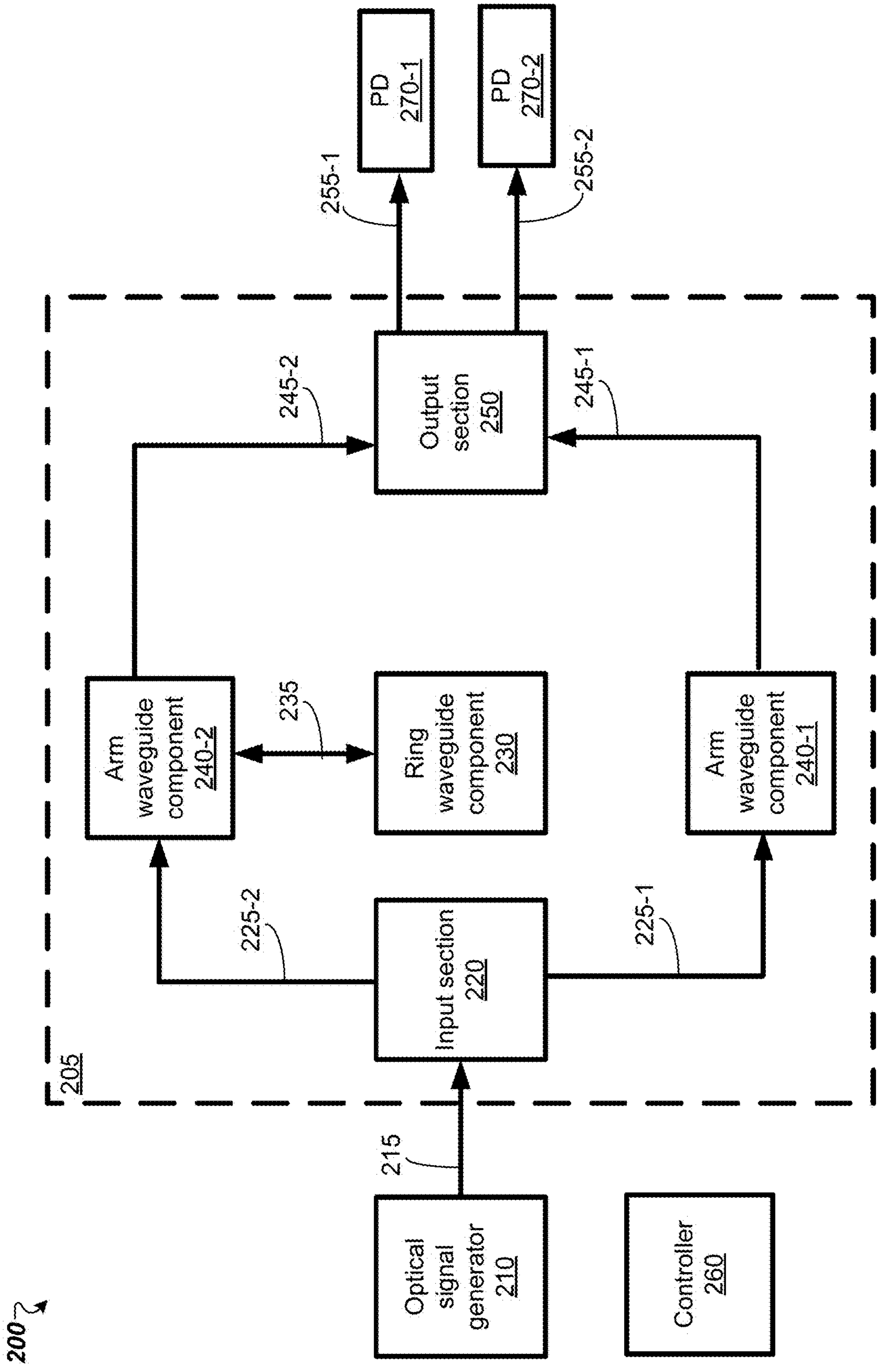
FIGS. 2A-2C are diagrams of example hybrid ring-interferometer tuning systems for efficient ring-assisted interferometer control, in accordance with at least some embodiments.

FIG. 2A is a diagram of an example system 200 implementing a thermal-efficient ring-based CWDM optical link, in accordance with at least some embodiments. More specifically, system 200 can include an optical link. As shown, system 200 includes optical signal generator 210. For example, optical signal generator 210 can generate input optical signal 215. In some embodiments, input optical signal 215 is a light signal. For example, optical signal generator 210 can include a laser. Input optical signal 215 can be a multiwavelength signal including a first wavelength and a second wavelength.

System 200 can further include ring-assisted interferometer 205. In some embodiments, ring-assisted interferometer 205 includes input section 220. Input section 220 can receive optical signal 215, and split optical signal 215 into at least two optical signals 225-1 and 225-2. Input section 220 can include an input splitter to split optical signal 215 into at least two optical signal 225-1 and 225-2. In some embodiments, input section 220 includes a 1×2 input splitter to split optical signal 215 into two optical signals 225-1 and 225-2. In some embodiments, input section 220 is separate from ring-assisted interferometer 205.

Ring-assisted interferometer 205 can include ring waveguide component 230 and an interferometer having arm waveguide component 240-1 and arm waveguide component 240-2. Ring waveguide component 230 can include a ring waveguide and a ring waveguide heater operatively coupled to the ring waveguide. Arm waveguide component 240-1 can include a first arm waveguide and a first arm waveguide heater operatively coupled to the firm arm waveguide. Arm waveguide component 240-2 can include a second arm waveguide and a second arm waveguide heater operatively coupled to the second arm waveguide. In some embodiments, the interferometer is an MZI. For example, the first arm waveguide can be a delay arm waveguide and the second arm waveguide can be a non-delay arm waveguide. The first arm waveguide of arm waveguide component 240-1 can receive optical signal 225-1 and output optical signal 245-1, and the second arm waveguide of arm waveguide component 240-2 can receive optical signal 225-2 and output optical signal 245-2. Optical signals 245-1 and 245-2 can each include the first wavelength and the second wavelength. As indicated by arrow 235, the second arm waveguide of arm waveguide component 240-2 is positioned to be optically coupled to the ring waveguide of ring waveguide component 230. In some embodiments, the second arm waveguide of arm waveguide component 240-2 is optically coupled to the ring waveguide of ring waveguide component 230 via at least one of: a pulley coupler, a point coupler, or an MMI-based coupler. The lack of arrow between ring waveguide component 230 and arm waveguide component 240-1 indicates that the first arm waveguide of arm waveguide component 240-1 is positioned to not be optically coupled to the ring waveguide. Additionally, the first arm waveguide of arm waveguide component 240-1 is positioned to be heated by the ring waveguide heater of ring waveguide component 230.

System 200 can further include output section 250. In some embodiments, output section 250 is a component of ring-assisted interferometer 205. In some embodiments, output section 250 is separate from ring-assisted interferometer 205. Output section 250 can receive optical signals 245-1 and 245-2, and output optical signals 255-1 and 255-2 that are generated from optical signals 245-1 and 245-2. Output section 250 can include an input combiner to combine optical signals 245-1 and 245-2 to generate optical signals 255-1 and 255-2. In some embodiments, output section 250 includes a 2×2 input combiner. In some embodiments, output section 250 includes a directional coupler. An example of ring-assisted interferometer 205 will be described below with reference to FIG. 2B.

System 200 can further include controller 260, which can be implemented by at least one processing device operatively coupled to a memory. The design of ring-assisted interferometer 205 can be optimized to enable controller 260 to control operation of the ring waveguide heater of ring waveguide component 230 in order to cause simultaneous or near-simultaneous thermal tuning of both the ring waveguide of ring waveguide component 230, and the interferometer having arm waveguide components 240-1 and 240-2. For example, controller 260 can simultaneously adjust the ring waveguide and the interferometer at approximately the same rate, which can shift the waveforms of the filter response of ring-assisted interferometer 205 with reduced perturbation (e.g., no perturbation). More specifically, as mentioned above, ring-assisted interferometer 205 can be designed such that the first arm waveguide of arm waveguide component 240-1 is positioned to be heated by the ring waveguide heater of ring waveguide component 230 and to not be optically coupled to the ring waveguide of ring waveguide component 230. That is, the first arm waveguide of arm waveguide component 240-1 (e.g., delay arm waveguide) can be placed in sufficient proximity to the ring waveguide of ring waveguide component 230 such that it will experience a temperature change caused by the ring waveguide heater of ring waveguide component 230, but without optical coupling. In some embodiments, the arm waveguide of arm waveguide component 240-1 is separated from the ring waveguide of ring waveguide component 230 by a distance (e.g., a fixed distance) that ranges from about 0.8 micrometer to about 1.2 micrometers. In some embodiments, the arm waveguide of arm waveguide component 240-1 is separated from the ring waveguide of ring waveguide component 230 by a distance of about 1 micrometer.

In some embodiments, controller 260 identifies a voltage to apply to the ring waveguide heater of ring waveguide component 230, and causes the voltage to be applied to the ring waveguide heater of ring waveguide component 230 to heat the ring waveguide of ring waveguide component 230 and the first arm waveguide of arm waveguide component 240-1. That is, the ring waveguide heater of ring waveguide component 230 can be configured to heat the first arm waveguide of arm waveguide component 240-1 and the ring waveguide of ring waveguide component 230 such that a ratio of a difference between a first optical phase shift ("phase shift") induced in the first arm waveguide of arm waveguide component 240-1 ($\Delta\phi_{arm1}$) and a second phase shift induced in the second arm waveguide of arm waveguide component 240-2 ($\Delta\phi_{arm2}$), to third phase shift induced in the ring waveguide of ring waveguide component 230 ($\Delta\phi_{ring}$), is a predetermined fraction. In some embodiments, the predetermined fraction is about one half. In other words, to cause the voltage to be applied to the ring waveguide heater of ring waveguide component 230 to heat the ring waveguide of ring waveguide component 230 and the first arm waveguide of arm waveguide component 240-1, controller 260 can cause $\Delta\phi_{ring}$ to be equal to about twice a difference between $\Delta\phi_{arm1}$ and $\Delta\phi_{arm2}$. For example, $\Delta\phi_{arm1}$ can correspond to an accumulated temperature change along a length of the first arm waveguide ($\Delta T_{arm1}$), $\Delta\phi_{arm2}$ can correspond to an accumulated temperature change along a length of the second arm waveguide ($\Delta T_{arm2}$), and $\Delta\phi_{ring}$ can correspond to an accumulated temperature change along a length of the ring waveguide ($\Delta T_{ring}$). Accordingly, the geometry of the ring waveguide heater, the ring waveguide, and the arm waveguides can be designed such that $$\Delta\phi_{arm1} - \Delta\phi_{arm2} = \frac{\Delta\phi_{ring}}{2}.$$

In some embodiments, and as shown in FIG. 2A, system 200 is implemented in a receiver (e.g., receiver 104 of FIG. 1). For example, system 200 can be implemented as a demultiplexer. More specifically, as described above, ring-assisted interferometer 205 can split optical signal 215 having a first wavelength with first encoded data and a second wavelength with second encoded data and traveling via a single waveguide, into optical signal 255-1 having the first wavelength and optical signal 255-2 having the second wavelength traveling via different waveguides. For example, system 200 can further include photodetector (PD) 270-1 and PD 270-1. In some embodiments, PDs 270-1 and 270-2 are implemented by photodiodes. PD 270-1 can be used to detect output optical signal 255-1, and PD 270-2 can be used to detect output optical signal 255-2.

In some embodiments, system 200 is implemented in a transmitter (e.g., transmitter 102 of FIG. 1). For example, system 200 can be implemented as a multiplexer. More specifically, optical signals 255-1 and 255-2 can be respective input signals each having a respective wavelength having different data encoded thereon, and optical signal 215 can be an output signal generated by combining the wavelengths into a single waveguide for transmission to a receiver.

Figure 2B:
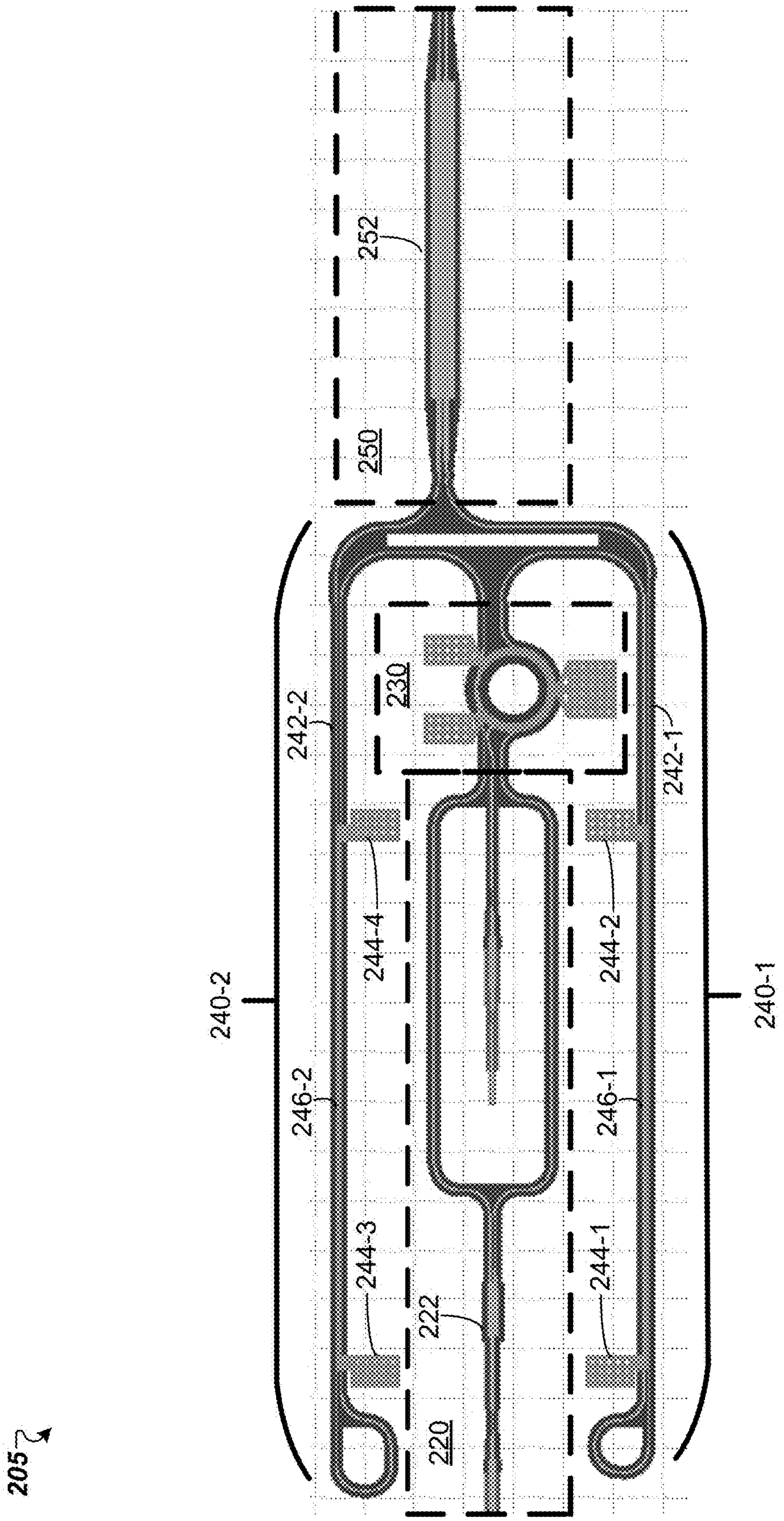
Figure 2C:
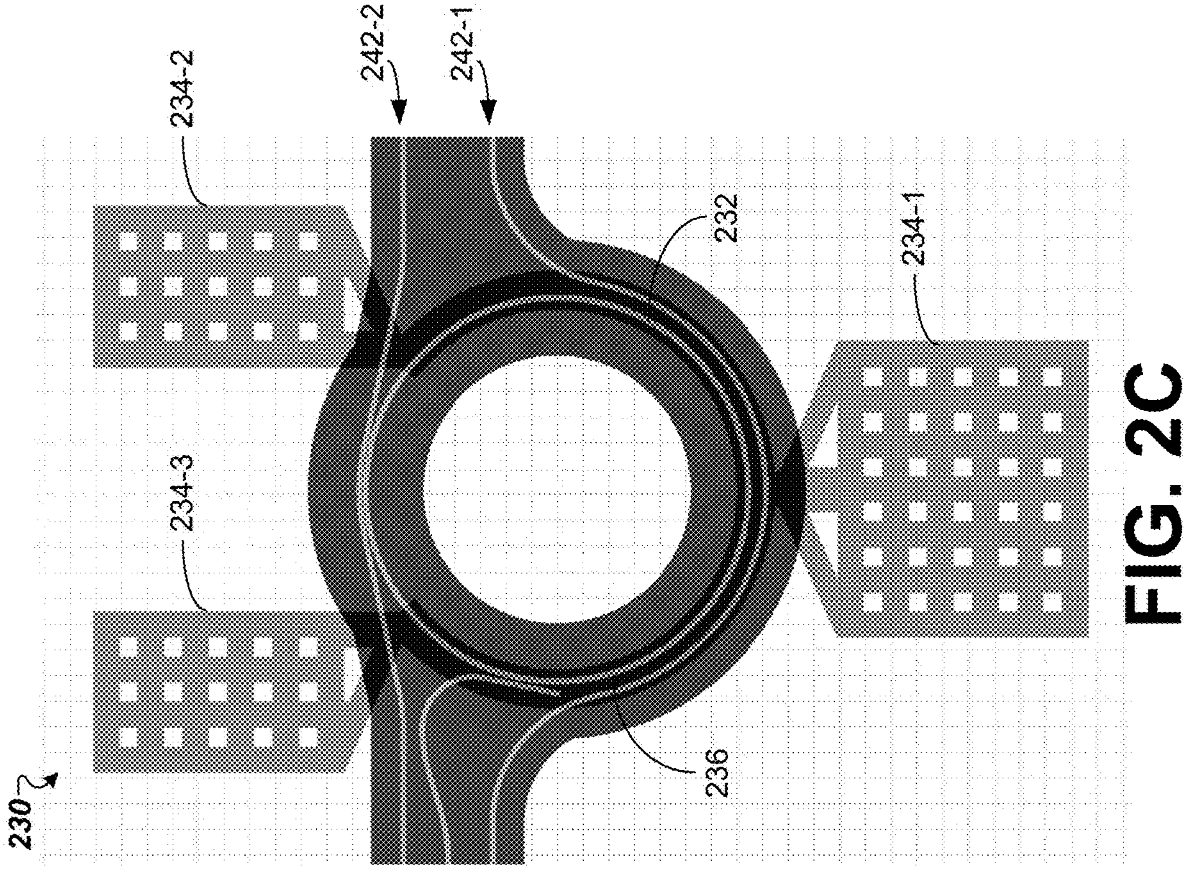

FIGS. 2B-2C are diagrams of example of ring-assisted interferometer 205, in accordance with at least some embodiments. Ring-assisted interferometer 205 includes input section 220, ring waveguide component 230, arm waveguide components 240-1 and 240-2, and output section 250, as described above with reference to FIG. 2A.

As shown in FIG. 2B, input section 220 includes input splitter 222 to generate split optical signals from an input optical signal. For example, input splitter 222 can receive the input optical signal from optical signal generator 210 of FIG. 2A. In some embodiments, input splitter is a 1×2 input splitter.

As shown in FIGS. 2B-2C, ring waveguide component 230 includes ring waveguide 232 operatively coupled to a ring waveguide heater including heater pads 234-1 through 234-3 attached to wire 236. Ring waveguide 232 can have a resonant wavelength ($\lambda_0$) or a resonant frequency ($f_0$) such that on-resonance wavelengths (i.e., photons of the optical signal having the resonant wavelength/frequency) are coupled to ring waveguide 232, while off-resonance wavelengths (i.e., photons of the optical signal not having the resonant wavelength/frequency) pass through. As further shown in FIGS. 2B-2C, arm waveguide component 240-1 includes arm waveguide 242-1 operatively coupled to an arm waveguide heater including heater pads 244-1 and 244-2 attached to wire 246-1. As further shown in FIGS. 2B-2C, arm waveguide component 240-2 includes arm waveguide 242-2 operatively coupled to an arm waveguide heater including heater pads 244-3 and 244-4 attached to wire 246-2. As further shown in FIG. 2B, arm waveguides 242-1 and 242-2 are coupled to input splitter 222 to receive respective split optical signals generated by input splitter 222. Arm waveguide 242-1 can be a delay arm waveguide that has a different geometry from arm waveguide 242-2 to delay the optical signal received from input splitter 222.

The design of ring-assisted interferometer 205 can be optimized to enable a controller including at least one processing device operatively coupled to a memory (e.g., controller 260 of FIG. 2A) to control operation of the ring waveguide heater in order to cause simultaneous or near-simultaneous thermal tuning of both ring waveguide 232 and the interferometer (including arm waveguides 242-1 and 242-2). For example, the controller can simultaneously adjust ring waveguide 232 and the interferometer at approximately the same rate, which can shift the waveforms of the filter response of ring-assisted interferometer 205 with reduced perturbation (e.g., no perturbation).

More specifically, as further shown in FIGS. 2B-2C, arm waveguide 242-1 is positioned to be heated by the ring waveguide heater and to not be optically coupled to ring waveguide 232. That is, the first arm waveguide (e.g., delay arm waveguide) can be brought in sufficient proximity to the ring waveguide such that it will experience a temperature change caused by the ring waveguide heater, but without optical coupling. In some embodiments, arm waveguide 242-1 is separated from ring waveguide 232 by a distance that ranges from about 0.8 micrometer to about 1.2 micrometers. In some embodiments arm waveguide 242-1 is separated from ring waveguide 232 by a distance of about 1 micrometer.

As further shown in FIGS. 2B-2C, arm waveguide 242-2 is positioned to be optically coupled to ring waveguide 232. Arm waveguide 242-2 can be optically coupled to ring waveguide 232 via at least one coupler. In this illustratively embodiment, the at least one coupler includes a pulley coupler. In alternatively embodiments, the at least one coupler can include a point coupler, an MMI-based coupler, etc.

The manner in which the arm waveguide 242-1 approaches ring waveguide 232 and the geometry of the ring waveguide heater (including heater pads 234-1 through 234-3 and wire 236) can be designed such that the spectra of the interferometer (including arm waveguides 242-1 and 242-2) and ring waveguide 232 shift at approximately the same rate. For example, when actuating the ring waveguide heater, an optical phase shift can be induced in ring waveguide 232 ($\Delta\phi_{ring}$), arm waveguide 242-1 ($\Delta\phi_{arm1}$), and arm waveguide 242-2 ($\Delta\phi_{arm2}$). The shape of the ring waveguide heater, ring waveguide 232, and the arm waveguides can be designed such that $$\Delta\phi_{arm1} - \Delta\phi_{arm2} = \frac{\Delta\phi_{ring}}{2}.$$

In some embodiments, the resonant frequency of ring waveguide 232 can be tuned (e.g., modified). For example, ring waveguide 232 can be formed from a material that exhibits the electro-optic effect (e.g., $LiNbO_3$, GaAs or InP), and the resonant frequency of ring waveguide 232 can be tuned using at least one electrical component. More specifically, at least one electrical component can be operatively coupled (e.g., integrated into) ring waveguide 232 to modify at least one property of ring waveguide 232. For example, applying a voltage (e.g., bias) to the at least one electrical component can cause a modification to at least the index of refraction of ring waveguide 232, which can tune the resonant frequency of ring waveguide 232. In this illustrative example, at least one electrical component includes a resistor or resistive heating element. However, at least one electrical component can include any suitable electronic component(s) in accordance with embodiments described herein. In some embodiments, at least one electrical component can include at least one of a diode, a resistor, or a transistor (e.g., field-effect transistor (FET)). At least one electrical component can enable a variable resonant frequency. At least one electrical component can include multiple electrical components (e.g., diodes, resistors and/or transistors) that have respective sensitivities can be used to tune the resonant frequency. Accordingly, at least one electrical component can include multiple electrical components to achieve greater precision in resonant frequency tuning, in some embodiments. An example of ring waveguide 232 that can be tuned by at least one electrical component will now be described below with reference to FIG. 3.

Figure 3:
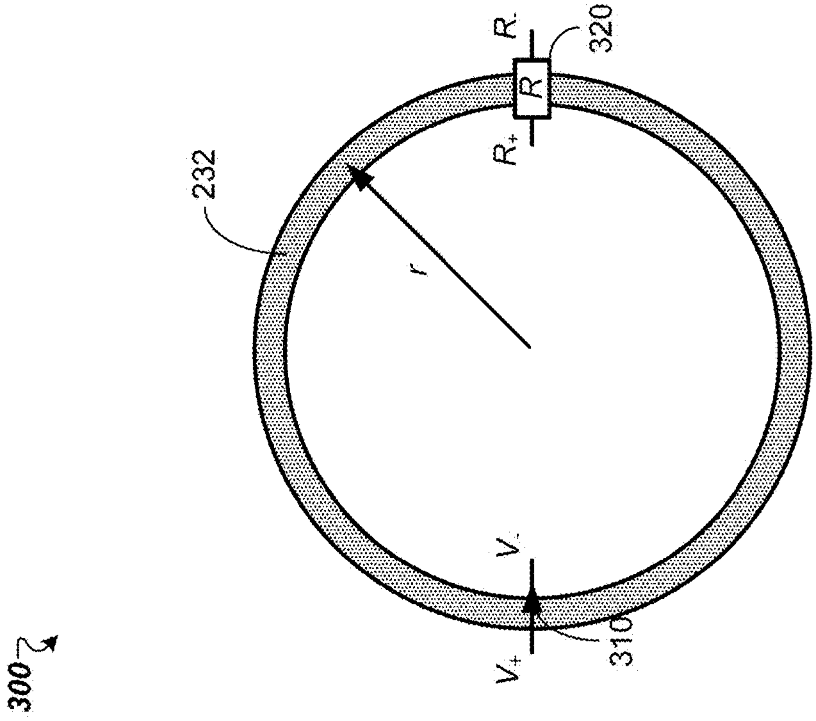
FIG. 3 is a diagram of an example ring waveguide apparatus, in accordance with at least some embodiments.

FIG. 3 illustrates an example ring waveguide apparatus 300, in accordance with at least some embodiments. Ring waveguide apparatus 300 can include ring waveguide 232. The arrow "r" denotes the radius of ring waveguide 232, as measured as the distance from the center of the ring to the center of ring waveguide 232. The radius of ring waveguide 232 can be on the order of micrometers or microns (μm) in some embodiments. In some embodiments, the radius of ring waveguide 232 is between about 1 μm to about 10 μm. In some embodiments, the radius of ring waveguide 232 is between about 3 μm to about 6 μm.

Ring waveguide 232 can be tuned to a resonant wavelength ($\lambda_0$) or a resonant frequency ($f_0$) such that on-resonance wavelengths (i.e., photons of the optical signal having the resonant wavelength/frequency) are coupled to ring waveguide 232, while off-resonance wavelengths (i.e., photons of the optical signal not having the resonant wavelength/frequency) pass through. Illustratively, assume that a first photon is an on-resonance photon. As this photon travels left to right, the first photon enters ring waveguide 232 via optical coupling. If a second photon is an on-resonance photon, then the second photon can add coherently (in phase and polarization and frequency) with the first photon that is already in ring waveguide 232. This initiates a process referred to as field enhancement, in which on-resonance photons continue to build up within ring waveguide 232. Ring waveguides 232 can be formed from any suitable material that has properties (e.g., index of refraction) defining the resonant wavelength/frequency, and thus enabling the optical coupling of on-resonance photons within ring waveguide 232. The field enhancement process described above cannot occur indefinitely. At a certain electrical field or optical power level, the number of on-resonance photons within ring waveguide 232 can reach a saturation threshold and begin to radiate or couple out of ring waveguide 232.

In some embodiments, the resonant frequency of ring waveguide 232 can be tuned (e.g., modified). For example, ring waveguide 232 can be formed from a material that exhibits the electro-optic effect (e.g., $LiNbO_3$, GaAs or InP), and the resonant frequency can be tuned using at least one electrical component. More specifically, at least one electrical component can be operatively coupled (e.g., integrated into) ring waveguide 232 to modify at least one property of ring waveguide 232. For example, applying a voltage (e.g., bias) to the at least one electrical component can cause a modification to at least the index of refraction of ring waveguide 232, which can tune the resonant frequency of ring waveguide 232. The at least one electrical component can include any suitable electronic component(s) in accordance with embodiments described herein. In some embodiments, the at least one electrical component can include at least one of a diode, a resistor, or a transistor (e.g., field-effect transistor (FET)). Thus, the at least one electrical component can enable a variable resonant frequency. Multiple electrical component (e.g., diodes, resistors and/or transistors) that have respective sensitivities can be used to tune the resonant frequency. Accordingly, the at least one electrical component can include multiple electrical components to achieve greater precision in resonant frequency tuning, in some embodiments.

In this illustrative embodiment, the at least one electrical component includes diode 310. In some embodiments, diode 310 is a P-N diode including a P-N junction between P-type semiconductor material and N-type semiconductor material. In some embodiments, diode 310 is a P-I-N diode, in which intrinsic semiconductor material (I) is disposed between P-type and N-type semiconductor material. For example, when diode 310 is in an off state (i.e., turned off), ring waveguide 232 can have an initial resonant frequency. When processing circuitry causes an amount of positive voltage to be applied to diode 310, diode 310 can generate a corresponding number of charge carriers for injection into ring waveguide 232. These charge carriers can modify the index of refraction of ring waveguide 232 in a manner that modifies the initial resonant frequency. As another example, if diode 310 is a P-N diode, then an amount of negative voltage applied to diode 310 can expand the depletion region between the P-type semiconductor material and the N-type semiconductor material. This can cause removal of charge carriers from ring waveguide 232, which can modify the initial resonant frequency. Additionally or alternatively, as shown in this illustrative embodiment, the at least one electrical component can include resistor (e.g., resistive heater) 320. For example, when processing circuitry causes an amount of voltage to be applied to resistor 320, resistor 320 can tune the local temperature which tunes the resonant frequency. Diode 310 and resistor 320 can adjust the resonant frequency with different amounts of granularity. For example, diode 310 can be a fine-tuning component and resistor 320 can be a coarse-tuning component.

Figure 4:
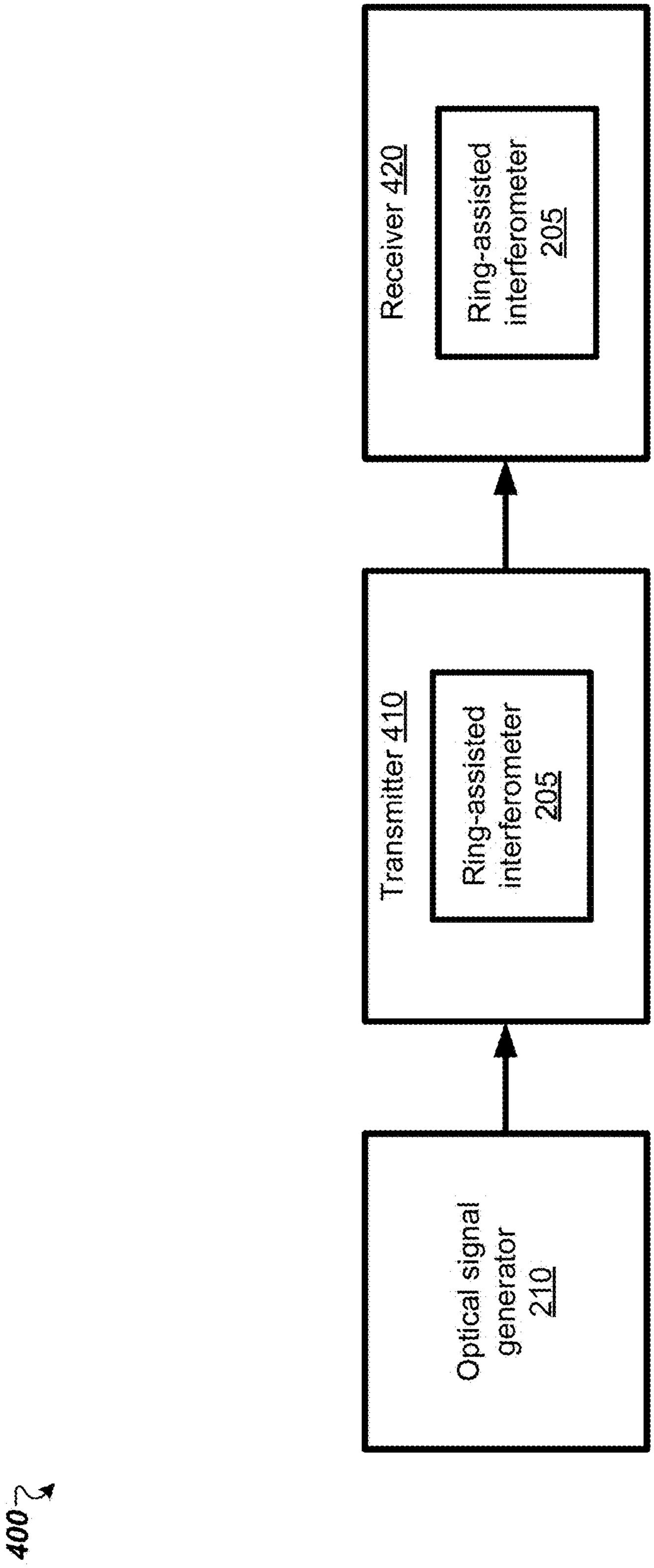
FIG. 4 is a diagram of an example system comprising a ring-assisted interferometer, in accordance with at least some embodiments.

FIG. 4 illustrates an example system 400 implementing a thermal-efficient ring-based CWDM optical link, in accordance with at least some embodiments. As shown, system 400 can include at least one optical signal generator 210, as described above with reference to FIG. 2A.

System 400 can further include transmitter 410. Transmitter 410 can be similar to transmitter 102 of FIG. 1. In some embodiments, and as shown in FIG. 4, transmitter 410 can include ring-assisted interferometer 205 as described above with reference to FIGS. 2A-3. In some embodiments, ring-assisted interferometer 205 can be separate from transmitter 410 (e.g., a standalone component).

System 400 can further include receiver 420 to receive optical signals from transmitter 420 (e.g., modulated optical signal). Receiver 420 can be similar to receiver 104 of FIG. 1. In some embodiments, receiver 420 includes ring-assisted interferometer 205. Further details regarding system 400 are described above with reference to FIGS. 1-3 and will now be described below with reference to FIG. 5.

Figure 5:
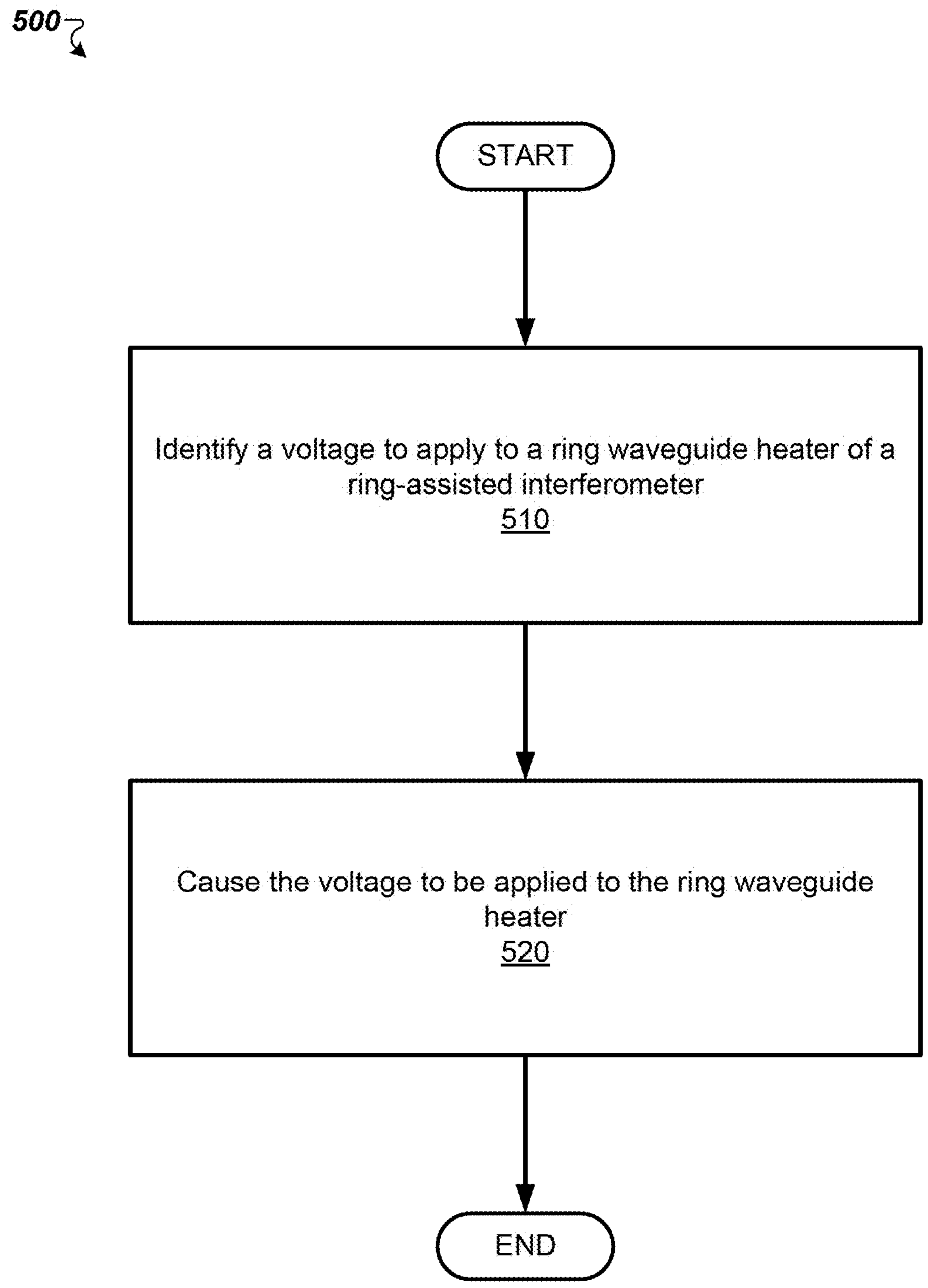
FIG. 5 is a flow diagram of an example method to implement hybrid ring-interferometer tuning systems for efficient ring-assisted interferometer control, in accordance with at least some embodiments.

FIG. 5 illustrates a flow diagram of a method 500 to implement hybrid ring-interferometer tuning systems for efficient ring-assisted interferometer control, according to at least one example embodiment. Method 500 can be performed by processing logic comprising hardware, software, firmware, or any combination thereof. In at least one embodiment, method 500 is performed by a controller, such as controller 260 of FIG. 2A. For example, method 500 can be implemented by a transmitter, such as transmitter 410 of FIG. 4. As another example, method 500 can be implemented by a receiver, such as receiver 420 of FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, processing logic identifies a voltage to apply to a ring waveguide heater of a ring-assisted interferometer. The ring-assisted interferometer can include a ring waveguide operatively coupled to the ring waveguide heater, and an interferometer including a first arm waveguide and a second arm waveguide. The first arm waveguide can be positioned to be heated by the ring waveguide heater and to not be optically coupled to the ring waveguide, and the second arm waveguide can be positioned to be optically coupled to the ring waveguide. In some embodiments, the interferometer is an MZI, the first arm waveguide is a delay arm waveguide, and the second arm waveguide is a non-delay arm waveguide. In some embodiments, a first arm waveguide heater is operatively coupled to the first arm waveguide, and a second arm waveguide heater is operatively coupled to the second arm waveguide. In some embodiments, the second arm waveguide is optically coupled to the ring waveguide via at least one of: a pulley coupler, a point coupler, or an MMI-based coupler.

The ring-assisted interferometer can be operatively coupled to an input section. In some embodiments, the input section includes an input splitter, operatively coupled to the first arm waveguide and the second arm waveguide, to receive an input optical signal including a first wavelength and a second wavelength. The first arm waveguide is to output a first optical signal comprising the first wavelength and the second wavelength, and the second arm waveguide is to output a second optical signal including the first wavelength and the second wavelength. In some embodiments, the input splitter is a 1×2 input splitter.

The ring-assisted interferometer can be operatively coupled to an output section. In some embodiments, the output section includes an input combiner, operatively coupled to the first arm waveguide and the second arm waveguide, to generate, based on the first optical signal and the second optical signal, a first output optical signal having the first wavelength and a second output optical signal having the second wavelength. In some embodiments, the input combiner is a 2×2 input combiner. In some embodiments, the output section includes a directional coupler.

At operation 520, processing logic causes the voltage to be applied to the ring waveguide heater. For example, the voltage can be applied to one or more heater pads of the ring waveguide heater. Causing the voltage to be applied to the ring waveguide heater to heat the ring waveguide and the first arm waveguide includes causing the ring waveguide heater to heat the first arm waveguide and the ring waveguide such that a ratio of a difference between a first accumulated phase shift induced in the first arm waveguide and a second accumulated phase shift induced in the second arm waveguide, to a third accumulated phase shift induced in the ring waveguide, is a predetermined fraction. In some embodiments, the predetermined fraction is about one half. For example, the first accumulated phase shift can correspond to an accumulated temperature change along a length of the first arm waveguide, the second accumulated phase shift can correspond to an accumulated temperature change along a length of the second arm waveguide, and the third accumulated phase shift can corresponds to an accumulated temperature change along a length of the ring waveguide. Further details regarding operations 510-520 are described above with reference to FIGS. 1-4.

Figure 6:
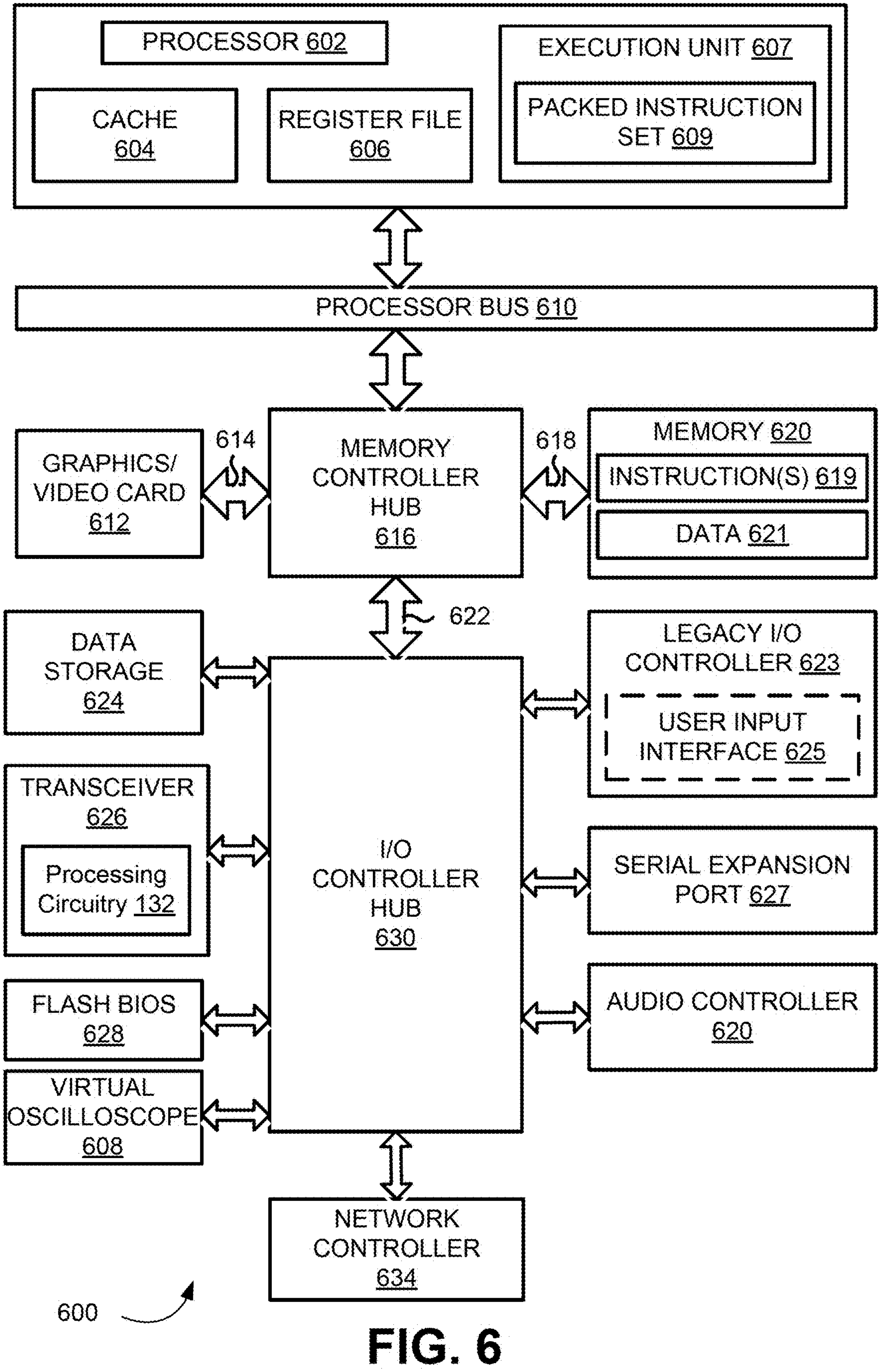
FIG. 6 illustrates an example computer system including a transceiver including a chip-to-chip interconnect, in accordance with at least some embodiments.

FIG. 6 illustrates an example computer system 600 including a transceiver including a chip-to-chip interconnect, in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as processor 602 to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 600 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, register file 606 may store different types of data in various registers including, without limitation, integer registers, floating point registers, status registers, and instruction pointer register.

In at least one embodiment, execution unit 607, including, without limitation, logic to perform integer and floating point operations, also resides in processor 602. Processor 602 may also include a microcode ("ucode") read only memory ("ROM") that stores microcode for certain macro instructions. In at least one embodiment, execution unit 602 may include logic to handle packed instruction set 609. In at least one embodiment, by including packed instruction set 609 in an instruction set of general-purpose processor 602, along with associated circuitry to execute instructions, operations used by many multimedia applications may be performed using packed data in general-purpose processor 602. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, memory 620. In at least one embodiment, memory 620 may be implemented as a DRAM device, an SRAM device, flash memory device, or other memory device. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 600 and to bridge data signals between processor bus 610, memory 620, and system I/O 622. In at least one embodiment, system logic chip may provide a graphics port for coupling to a graphics controller. In at least one embodiment, MCH 616 may be coupled to memory 620 through high bandwidth memory path 618 and graphics/video card 612 may be coupled to MCH 616 through Accelerated Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, local I/O bus may include, without limitation, a high-speed I/O bus for connecting peripherals to memory 620, a chipset, and processor 602. Examples may include, without limitation, audio controller 629, firmware hub ("flash BIOS") 628, transceiver 626, a data storage 624, legacy I/O controller 623 containing user input interface 625 and a keyboard interface, serial expansion port 627, such as a USB, and network controller 634. Data storage 624 may comprise a hard disk drive, a floppy disk drive, a CD-ROM device, a flash memory device, or other mass storage device. In an embodiment, transceiver 626 includes a constrained FFE 608.

In at least one embodiment, FIG. 6 illustrates a system, which includes interconnected hardware devices or "chips" in transceiver 626—e.g., transceiver 626 includes a chip-to-chip interconnect including first device 110 and second device 112 as described with reference to FIG. 1). In at least one embodiment, FIG. 6 may illustrate an exemplary SoC. In at least one embodiment, devices illustrated in FIG. 6 may be interconnected with proprietary interconnects, standardized interconnects (e.g., PCIe), or some combination thereof. In at least one embodiment, one or more components of system 600 are interconnected using compute express link ("CXL") interconnects. In an embodiment, transceiver 626 can include processing circuitry 132 as described with reference to FIG. 1. In such embodiments, processing circuitry 132 can facilitate a method to implement phase-dithering techniques for encoding auxiliary information within an optical signal. For example, processing circuitry 132 can implement techniques for implementing CWDMs with ring resonators, as described with reference to FIGS. 2-5.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase “based on” means “based at least in part on” and not “based solely on.”

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., “such as”) provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms “coupled” and “connected,” along with their derivatives, may be used. It should be understood that these terms may not be intended as synonyms for each other. Rather, in particular examples, “connected” or “coupled” may be used to indicate that two or more elements are in direct or indirect physical or electrical contact with each other. “Coupled” may also mean that two or more elements are not in direct contact with each other, but yet still co-operate or interact with each other.

Unless specifically stated otherwise, it may be appreciated that throughout specification terms such as “processing,” “computing,” “calculating,” “determining,” or like, refer to action and/or processes of a computer or computing system, or similar electronic computing device, that manipulate and/or transform data represented as physical, such as electronic, quantities within computing system’s registers and/or memories into other data similarly represented as physical quantities within computing system’s memories, registers or other such information storage, transmission or display devices.

In a similar manner, the term “processor” may refer to any device or portion of a device that processes electronic data from registers and/or memory and transform that electronic data into other electronic data that may be stored in registers and/or memory. A “computing platform” may comprise one or more processors. As used herein, “software” processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms “system” and “method” are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:

a ring waveguide;

a ring waveguide heater operatively coupled to the ring waveguide; and an interferometer comprising a delay arm waveguide and a non-delay arm waveguide, wherein the delay arm waveguide is positioned to be heated by the ring waveguide heater and to not be optically coupled to the ring waveguide, and wherein the non-delay arm waveguide is positioned to be optically coupled to the ring waveguide.

2. The system of claim 1, wherein:

the interferometer comprises a Mach-Zehnder interferometer.

3. The system of claim 1, wherein the non-delay arm waveguide is optically coupled to the ring waveguide via at least one of: a pulley coupler, a point coupler, or a multimode interferometer (MMI)-based coupler.

4. The system of claim 1, further comprising a first arm waveguide heater operatively coupled to the delay arm waveguide, and a second arm waveguide heater operatively coupled to the non-delay arm waveguide.

5. The system of claim 1, further comprising:

an input section comprising an input splitter, operatively coupled to the delay arm waveguide and the non-delay arm waveguide, to receive an input optical signal comprising a first wavelength and a second wavelength, wherein the first delay arm waveguide is to output a first optical signal comprising the first wavelength and the second wavelength, and wherein the non-delay arm waveguide is to output a second optical signal comprising the first wavelength and the second wavelength; and an output section comprising an input combiner, operatively coupled to the delay arm waveguide and the non-delay arm waveguide, to generate, based on the first optical signal and the second optical signal, a first output optical signal having the first wavelength and a second output optical signal having the second wavelength.

6. The system of claim 1, further comprising at least one processing device, operatively coupled to a memory, to:

identify a voltage to apply to the ring waveguide heater; and cause the voltage to be applied to the ring waveguide heater to heat the ring waveguide and the delay arm waveguide.

7. The system of claim 1, wherein the ring waveguide heater is configured to heat the delay arm waveguide and the ring waveguide such that a ratio of a difference between a first accumulated phase shift induced in the delay arm waveguide and a second accumulated phase shift induced in the non-delay arm waveguide, to a third accumulated phase shift induced in the ring waveguide, is a predetermined fraction.

8. The system of claim 7, wherein:

the first accumulated phase shift corresponds to an accumulated temperature change along a length of the delay arm waveguide;

the second accumulated phase shift corresponds to an accumulated temperature change along a length of the non-delay arm waveguide; and the third accumulated phase shift corresponds to an accumulated temperature change along a length of the ring waveguide.

9. The system of claim 7, wherein the predetermined fraction is about one half.

10. A system comprising:

a ring-assisted interferometer comprised within a component of an optical link, the ring-assisted interferometer comprising:

a ring waveguide;

a ring waveguide heater operatively coupled to the ring waveguide; and an interferometer comprising a delay arm waveguide and a non-delay arm waveguide, wherein the delay arm waveguide is positioned to be heated by the ring waveguide heater and to not be optically coupled to the ring waveguide, and wherein the non-delay arm waveguide is positioned to be optically coupled to the ring waveguide; and at least one processing device, operatively coupled to a memory, to identify a voltage to apply to the ring waveguide heater, and to cause the voltage to be applied to the ring waveguide heater to heat the ring waveguide and the delay arm waveguide.

11. The system of claim 10, wherein:

the interferometer comprises a Mach-Zehnder interferometer; and the non-delay arm waveguide is optically coupled to the ring waveguide via at least one of: a pulley coupler, a point coupler, or a multimode interferometer (MMI)-based coupler.

12. The system of claim 10, wherein the ring-assisted interferometer further comprises a first arm waveguide heater operatively coupled to the delay arm waveguide, and a second arm waveguide heater operatively coupled to the non-delay arm waveguide.

13. The system of claim 10, wherein the ring-assisted interferometer further comprises:

an input section comprising an input splitter, operatively coupled to the delay arm waveguide and the non-delay arm waveguide, to receive an input optical signal comprising a first wavelength and a second wavelength, wherein the delay arm waveguide is to output a first optical signal comprising the first wavelength and the second wavelength, and wherein the non-delay arm waveguide is to output a second optical signal comprising the first wavelength and the second wavelength; and an output section comprising an input combiner, operatively coupled to the delay arm waveguide and the non-delay arm waveguide, to generate, based on the first optical signal and the second optical signal, a first output optical signal having the first wavelength and a second output optical signal having the second wavelength.

14. The system of claim 10, wherein the ring waveguide heater is configured to heat the delay arm waveguide and the ring waveguide such that a ratio of a difference between a first accumulated phase shift induced in the delay arm waveguide and a second accumulated phase shift induced in the non-delay arm waveguide, to a third accumulated phase shift induced in the ring waveguide, is a predetermined fraction.

15. The system of claim 14, wherein:

the first accumulated phase shift corresponds to an accumulated temperature change along a length of the delay arm waveguide;

the second accumulated phase shift corresponds to an accumulated temperature change along a length of the non-delay arm waveguide; and the third accumulated phase shift corresponds to an accumulated temperature change along a length of the ring waveguide.

16. The system of claim 14, wherein the predetermined fraction is about one half.

17. The system of claim 10, wherein the component of the optical link comprises a transmitter.

18. The system of claim 10, wherein the component of the optical link comprises a receiver.

19. A method, comprising:

identifying, by a processing device, a voltage to apply to a ring waveguide heater operatively coupled to a ring waveguide of a ring-assisted interferometer, wherein the ring-assisted interferometer further comprises a delay arm waveguide and a non-delay arm waveguide, wherein the delay arm waveguide is positioned to be heated by the ring waveguide heater and to not be optically coupled to the ring waveguide, and wherein the non-delay arm waveguide is positioned to be optically coupled to the ring waveguide; and causing, by the processing device, the voltage to be applied to the ring waveguide heater to heat the ring waveguide and the delay arm waveguide.

20. The method of claim 19, wherein causing the voltage to be applied to the ring waveguide heater to heat the delay arm waveguide and the ring waveguide such that a ratio of a difference between a first accumulated phase shift induced in the delay arm waveguide and a second accumulated phase shift induced in the non-delay arm waveguide, to a third accumulated phase shift induced in the ring waveguide, is about one half.

* * * * *